US009650459B2

(12) United States Patent  
Greco et al.

(10) Patent No.: US 9,650,459 B2  
(45) Date of Patent: May 16, 2017

(54) METHODS FOR CONTROLLING DIE SWELL IN DUAL CATALYST OLEFIN POLYMERIZATION SYSTEMS

(71) Applicant: Chevron Phillips Chemical Company LP, The Woodlands, TX (US)

(72) Inventors: Jeff F Greco, Tulsa, OK (US); Qing Yang, Bartlesville, OK (US); Vivek Rohatgi, Owasso, OK (US); Mark L. Hlavinka, Tulsa, OK (US); Jim B Askew, Barnsdall, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/848,405

(22) Filed: Sep. 9, 2015

(65) Prior Publication Data

US 2017/0066857 A1    Mar. 9, 2017

(51) Int. Cl.
```
C08F 4/653      (2006.01)
C08F 4/6592     (2006.01)
C08F 210/02     (2006.01)
C08F 210/14     (2006.01)
C08F 4/659      (2006.01)
C08F 210/16     (2006.01)
```

(52) U.S. Cl.
CPC ........ *C08F 210/14* (2013.01); *C08F 4/65904* (2013.01); *C08F 4/65916* (2013.01); *C08F 210/02* (2013.01); *C08F 210/16* (2013.01)

(58) Field of Classification Search
CPC . C08F 4/65904; C08F 4/65916; C08F 210/02  
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,310,834 A | 5/1994 | Katzen et al. |
| 5,350,818 A | 9/1994 | Malpass, Jr. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,787,608 B2 | 9/2004 | VanDun et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin |
| 7,226,886 B2 | 6/2007 | Jayaratne et al. |
| 7,294,599 B2 | 11/2007 | Jensen et al. |
| 7,300,983 B2 | 11/2007 | Degroot et al. |
| 7,312,283 B2 | 12/2007 | Martin et al. |
| 7,517,939 B2 | 4/2009 | Yang et al. |
| 7,601,665 B2 | 10/2009 | McDaniel et al. |
| 7,619,047 B2 | 11/2009 | Yang et al. |
| 7,858,702 B2 | 12/2010 | Jaker |
| 7,884,163 B2 | 2/2011 | McDaniel et al. |
| 7,919,639 B2 | 4/2011 | Murray et al. |
| 8,080,681 B2 | 12/2011 | Murray et al. |

(Continued)

FOREIGN PATENT DOCUMENTS

| | | |
|---|---|---|
| WO | WO 2007/117520 | 10/2007 |
| WO | WO 2008/136621 | 11/2008 |

(Continued)

OTHER PUBLICATIONS

U.S. Appl. No. 14/848,395, entitled "*Polymers with Improved ESCR for Blow Molding Applications*," filed Sep. 9, 2015.  
Modern Plastics Encyclopedia, Mid-Nov. 1995 Issue, vol. 72, No. 12, 3 pages.  
Film Extrusion Manual—Process, Materials, Properties, TAPPI Press, 1992, 16 pages.  
Hieber et al., "Some correlations involving the shear viscosity of polystyrene melts," Rheologica Acta, 1989, vol. 28, pp. 321-332.  
Hieber et al., "Shear-Rate-Dependence Modeling of Polymer Melt Viscosity," Polymer Engineering and Science, 1992, 32(14), pp. 931-938.  
Bird et al., "Dynamics of Polymeric Liquids," vol. 1, Fluid Mechanics, 2nd Edition, John Wiley & Sons, 1987, 3 pages.  
Janzen et al., "Diagnosing long-chain branching in polyethylenes," Journal of Molecular Structure, 1999, 485-486, pp. 569-584.

(Continued)

*Primary Examiner* — Caixia Lu  
(74) *Attorney, Agent, or Firm* — Merchant & Gould P.C.

(57) ABSTRACT

Methods for controlling the die swell of an olefin polymer produced using a dual catalyst system are disclosed. The die swell of the olefin polymer can be increased or decreased as a function of the catalyst weight ratio and the reactant molar ratio used during the olefin polymerization process.

17 Claims, No Drawings

(56) References Cited

U.S. PATENT DOCUMENTS

| | | |
|---|---|---|
| 8,114,946 B2 | 2/2012 | Yang et al. |
| 8,138,113 B2 | 3/2012 | Yang et al. |
| 8,202,940 B2 | 6/2012 | Jaker et al. |
| 8,309,485 B2 | 11/2012 | Yang et al. |
| 8,318,883 B1 | 11/2012 | Yang et al. |
| 8,383,730 B2 | 2/2013 | Jaker et al. |
| 8,383,754 B2 | 2/2013 | Yang et al. |
| 8,623,973 B1 | 1/2014 | McDaniel et al. |
| 8,691,715 B2 | 4/2014 | Yang et al. |
| 8,912,285 B2 | 12/2014 | Yang et al. |
| 9,006,367 B2 | 4/2015 | McDaniel et al. |
| 9,156,970 B2 | 10/2015 | Hlavinka et al. |
| 9,169,337 B2 | 10/2015 | Rohatgi et al. |
| 9,175,111 B2 | 11/2015 | Kapur et al. |
| 9,181,370 B2 | 11/2015 | Sukhadia et al. |
| 9,181,372 B2 | 11/2015 | Yang et al. |
| 9,273,170 B2 | 3/2016 | Hlavinka et al. |
| 2004/0059070 A1 | 3/2004 | Whitte |
| 2005/0239976 A1 | 10/2005 | McDaniel et al. |
| 2006/0235171 A1 | 10/2006 | Lee et al. |
| 2008/0275197 A1 | 11/2008 | Coffy et al. |
| 2014/0004285 A1 | 1/2014 | Boissiere et al. |
| 2014/0088274 A1 | 3/2014 | Ding et al. |
| 2014/0342141 A1 | 11/2014 | Cui et al. |
| 2015/0065669 A1 | 3/2015 | Hlavinka et al. |
| 2015/0259455 A1 | 9/2015 | Hlavinka et al. |
| 2016/0053035 A1 | 2/2016 | Rohatgi et al. |
| 2016/0122454 A1 | 5/2016 | Hlavinka et al. |

FOREIGN PATENT DOCUMENTS

| | | |
|---|---|---|
| WO | WO 2009/085922 | 7/2009 |
| WO | WO 2012/170762 | 12/2012 |

OTHER PUBLICATIONS

Wyatt, "Light scattering and the absolute characterization of macromolecules," Wyatt Technology Corporation, Analytica Chimica Acta, 272, 1993, pp. 1-40.

Arnett et al., "Zero-Shear Viscosity of Some Ethyl Branched Paraffinic Model Polymers," Journal of Physical Chemistry, 1980, 84(6), pp. 649-652.

Yu, et al. entitled "Long Chain Branches in Metallocene-Catalyzed Polyethylene Determined by a Combination of SEC/Multi-Angle Light Scattering, NMR and Rheology," published in *Polymer Preprints* 2003, vol. 44 (2), pp. 49-50.

Article entitled "SABIC Expands Product Portfolio by Adding Bimodal HDPE Blow Molding Grades for Bottles," published Mar. 5, 2013, 1 page.

Kapur, Mridula (Babli), article entitled "Next Generation HDPE for Blow Molding Applications," published in ANTEC 2009, pp. 65-69.

Marlex® HXB TR-512 Data Sheet, May 2007, 1 page.

Marlex® HXM 50100 Data Sheet, May 2007, 1 page.

International Search Report for PCT/US2016/049883 dated Nov. 16, 2016, 5 pages.

International Search Report for PCT/US2016/049905 dated Nov. 23, 2016, 5 pages.

Koopmans, entitled *"Die Swell-Molecular Structure Model for Linear Polyethylene,"* Journal of Polymer Science: Part A: Polymer Chemistry, 1988, vol. 26, pp. 1157-1164.

METHODS FOR CONTROLLING DIE SWELL IN DUAL CATALYST OLEFIN POLYMERIZATION SYSTEMS

BACKGROUND OF THE INVENTION

Olefin polymers typically swell, or increase in thickness, during melt processing when the molten polymer exits the die. There are numerous factors that influence the amount of die swell that occurs in fabrication processes such as blow molding, and these can include extrusion pressure, polymer melt temperature, extrusion output rate, and die geometry effects such as die diameter and die land length, among others.

Notwithstanding these factors, certain polymerization conditions used during the production of the olefin polymer also can impact the amount of die swell, and the ability to reduce the amount of die swell (or increase, if needed) can be beneficial for the efficient production of blow molding articles, such as bottles and other containers. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various processes and methods related to the control of the die swell of an olefin polymer produced using a dual catalyst polymerization process are disclosed herein. In one embodiment, a polymerization process can comprise (1) contacting a dual catalyst system with an olefin monomer and an olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise a catalyst weight ratio of the first:second catalyst component and a reactant molar ratio of the comonomer:monomer; and (2) controlling a die swell of the olefin polymer by adjusting the catalyst weight ratio and/or the reactant molar ratio.

A method for controlling the die swell of an olefin polymer is provided herein, and in this embodiment, the method can comprise (i) contacting a dual catalyst system with an olefin monomer and an olefin comonomer in a polymerization reactor system under polymerization conditions to produce the olefin polymer, wherein the dual catalyst system comprises a first metallocene catalyst component and a second metallocene catalyst component, and wherein the polymerization conditions comprise a catalyst weight ratio of the first:second catalyst component, and a reactant molar ratio of the comonomer:monomer; and (ii) adjusting the catalyst weight ratio and/or the reactant molar ratio to control the die swell of the olefin polymer.

A process for producing an olefin polymer with a target die swell also is provided herein, and in this embodiment, the process can comprise (a) contacting a dual catalyst system with an olefin monomer and an olefin comonomer in a polymerization reactor system under polymerization conditions, wherein the dual catalyst system comprises a first metallocene catalyst component and a second metallocene catalyst component, and wherein the polymerization conditions comprise a catalyst weight ratio of the first:second catalyst component, and a reactant molar ratio of the comonomer:monomer; and (b) controlling the catalyst weight ratio and/or the reactant molar ratio to produce the olefin polymer with the target die swell.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator," "an olefin comonomer," etc., is meant to encompass one, or mixtures or combinations of more than one, activator, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methyl-butane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence of absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of the high or higher molecular weight component to the low or lower molecular weight component can be in a range from about 1:10 to about 10:1 in certain embodiments. By a disclosure that the weight ratio of the high or higher molecular weight component to the low or lower molecular weight component can be in a range from about 1:10 to about 10:1, Applicants intend to recite that the weight ratio can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon).

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. An "alkyl group" and an "alkane" can be linear or branched unless otherwise specified. Primary, secondary, and tertiary alkyl groups can be derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ ($R \neq H$), $R_2CH$ ($R \neq H$), and $R_3C$ ($R \neq H$) are primary, secondary, and tertiary alkyl groups, respectively. The carbon atom by which the indicated moiety is attached is a secondary, tertiary, and quaternary carbon atom, respectively.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture.

Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are processes and methods directed to controlling or adjusting the die swell of olefin polymers in applications such as blow molding via the control or adjustment of certain polymerization reaction conditions. It was surprisingly found that certain polymerization reaction conditions, while other process parameters were held substantially constant, resulted in a dramatic change in the die swell of the resulting polymer during article fabrication.

Generally, dual metallocene catalyst systems can be employed to produce the olefin polymers contemplated herein, and typically, one catalyst component of the dual catalyst system can produce primarily a high or higher molecular weight component and the other catalyst component can produce primarily a low or lower molecular weight component. The polymerization reaction can be conducted in any suitable polymerization reactor system containing one reactor, or alternatively, two or more reactors in series or parallel.

Processes and Methods for Controlling Die Swell

Consistent with an embodiment of this invention, a polymerization process is disclosed. In this embodiment, the polymerization process can comprise:

(1) contacting a dual catalyst system with an olefin monomer and an olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise:
a catalyst weight ratio of the first:second catalyst component, and
a reactant molar ratio of the comonomer:monomer; and (2) controlling a die swell of the olefin polymer by adjusting the catalyst weight ratio and/or the reactant molar ratio.

In another embodiment, a method of controlling the die swell of an olefin polymer is disclosed. In this embodiment, the method can comprise:

(i) contacting a dual catalyst system with an olefin monomer and an olefin comonomer in a polymerization reactor system under polymerization conditions to produce the olefin polymer, wherein the dual catalyst system comprises a first metallocene catalyst component and a second metallocene catalyst component, and wherein the polymerization conditions comprise:
a catalyst weight ratio of the first:second catalyst component, and
a reactant molar ratio of the comonomer:monomer; and (ii) adjusting the catalyst weight ratio and/or the reactant molar ratio to control the die swell of the olefin polymer.

In yet another embodiment, a process for producing an olefin polymer with a target die swell is disclosed. In this embodiment, the process can comprise:

(a) contacting a dual catalyst system with an olefin monomer and an olefin comonomer in a polymerization reactor system under polymerization conditions, wherein the dual catalyst system comprises a first metallocene catalyst component and a second metallocene catalyst component, and wherein the polymerization conditions comprise:
a catalyst weight ratio of the first:second catalyst component, and
a reactant molar ratio of the comonomer:monomer; and (b) controlling the catalyst weight ratio and/or the reactant molar ratio to produce the olefin polymer with the target die swell.

Generally, the features of the processes and methods disclosed herein (e.g., the dual catalyst system, the first metallocene catalyst component, the second metallocene component, the olefin monomer, the olefin comonomer, the polymerization conditions, the catalyst weight ratio, the reactant molar ratio, and the die swell, among others) are independently described herein, and these features can be combined in any combination to further describe the disclosed processes and methods.

The catalyst weight ratio of the first:second catalyst component—i.e., the weight ratio of the first metallocene catalyst component to the second metallocene catalyst component—in the dual catalyst system generally is not limited to any particular range of weight ratios. Nonetheless, in some embodiments, the catalyst weight ratio of the first:second catalyst component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the catalyst weight ratio can include, but are not limited to, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like. Unexpectedly, in the methods and processes disclosed herein, the die swell of the olefin polymer can decrease as the catalyst weight ratio increases.

Likewise, the reactant molar ratio of the comonomer:monomer—i.e., the molar ratio of the olefin comonomer to the olefin monomer—in the polymerization reactor generally is not limited to any particular range of molar ratios. Nonetheless, in some embodiments, the reactant molar ratio of the comonomer:monomer can be in a range of from about 0.01:1 to about 0.5:1, from about 0.01:1 to about 0.4:1, from about 0.01:1 to about 0.3:1, from about 0.01:1 to about 0.2:1, or from about 0.02:1 to about 0.2:1. Accordingly, suitable ranges for the reactant molar ratio can include, but are not limited to, from about 0.02:1 to about 0.15:1, from about 0.02:1 to about 0.1:1, from about 0.02:1 to about 0.05:1, from about 0.03:1 to about 0.3:1, from about 0.03:1 to about 0.2:1, from about 0.03:1 to about 0.15:1, or from about 0.03:1 to about 0.1:1, and the like. Unexpectedly, in the methods and processes disclosed herein, the die swell of the olefin polymer can decrease as the reactant molar ratio increases.

In some embodiments, the olefin polymer can comprise an ethylene copolymer, for example, an ethylene/α-olefin copolymer such as an ethylene/1-hexene copolymer. In these embodiments, the reactant molar ratio can be the molar ratio of α-olefin:ethylene, or the molar ratio of 1-hexene: ethylene, if producing an ethylene/1-hexene copolymer.

As disclosed, the die swell of the olefin polymer can decrease as the catalyst weight ratio increases, or the die swell of the olefin polymer can decrease as the reactant molar ratio increases, or the die swell of the olefin polymer can decrease as the catalyst weight ratio and the reactant molar ratio increase.

Moreover, in these processes and methods, the catalyst weight ratio can be adjusted or controlled (e.g., increased, decreased), or the reactant molar ratio time can be adjusted or controlled (e.g., increased, decreased), or both the catalyst weight ratio and the reactant molar ratio can be adjusted or controlled (e.g., increased, decreased). Consistent with embodiments disclosed herein, the catalyst weight ratio and the reactant molar ratio can be used to control, adjust, fine-tune, etc., the production and properties of a particular olefin polymer with a desired die swell and other desired polymer characteristics. Further, other polymerization process parameters also can be varied, if necessary, and as described herein for example.

The die swell (percentage) of the olefin polymer often can be determined by the technique disclosed herein, although other methods for determining the die swell, and for determining the impact of the catalyst weight ratio and the reactant molar ratio on the die swell, can be used. Using the technique disclosed herein, the die swell typically falls within a range from about 10 to about 70%, from about 15 to about 70%, from about 20 to about 70%, from about 20 to about 65%, from about 20 to about 60%, from about 25 to about 65%, from about 25 to about 60%, from about 25 to about 55%, or from about 30 to about 55%, and the like. Often in blow molding, olefin polymers with excessive die swell result in higher pressures in extrusion/molding equipment and greater waste, while olefin polymers with minimal die swell can result in incomplete mold filling and unacceptable part quality.

In some embodiments, the olefin polymer can comprise a high or higher molecular weight component and a low or lower molecular weight component, and the weight ratio of the high or higher molecular weight component to the low or lower molecular weight component typically falls within a range from about 1:25 to about 25:1, from about 1:15 to about 15:1, from about 1:10 to about 10:1, or from about 1:8 to about 8:1. Other suitable ranges for the weight ratio of the high or higher molecular weight component to the low or lower molecular weight component can include, but are not limited to, from about 1:7 to about 7:1, from about 1:5 to about 5:1, from about 1:4 to about 4:1, from about 1:3 to about 3:1, from about 1:2 to about 2:1, from about 1:1.5 to about 1.5:1, from about 1:1.25 to about 1.25:1, or from about 1:1.1 to about 1.1:1, and the like.

In a particular embodiment of this invention, the weight ratio of the high or higher molecular weight component to the low or lower molecular weight component can increase as the catalyst weight ratio increases, or this weight ratio can increase as the reactant molar ratio increases, or this weight ratio can increase as the catalyst weight ratio and the reactant molar ratio increase. This is particularly unexpected, since an increase in the catalyst weight ratio increases the relative amount of the first catalyst component, which generally produces the low or lower molecular weight component of the olefin polymer, yet it appears that in certain dual metallocene catalyst systems and polymerization processes, this catalyst weight ratio change ultimately results in a greater proportion of the high or higher molecular weight component.

Thus, the weight ratio of the high or higher molecular weight component to the low or lower molecular weight component can increase as the catalyst weight ratio and/or the reactant molar ratio increases. Additionally or alternatively, the weight-average molecular weight (Mw) and the polydispersity index (Mw/Mn) can increase as the catalyst weight ratio and/or the reactant molar ratio increases. Additionally or alternatively, the ratio of HLMI/MI can increase as the catalyst weight ratio and/or the reactant molar ratio increases. Additionally or alternatively, the rheological slope parameter (the slope of a plot of the viscosity (Pa-sec) versus shear rate ($sec^{-1}$) of the ethylene polymer at 100 $sec^{-1}$) can decrease as the catalyst weight ratio and/or the reactant molar ratio increases.

For the production of a particular grade of an olefin polymer, with certain desired polymer properties, a target die swell of the olefin polymer can be established. Thus, when the particular polymer grade is produced, variables can be adjusted in order to achieve the targeted die swell. Accordingly, in some embodiments, the processes and methods provided herein optionally can further comprise the steps of determining (or measuring) the die swell, and then adjusting the catalyst weight ratio and/or the reactant molar ratio based on the difference between the measured die swell and the target die swell. As a representative example, if the measured die swell is different from that of the target die swell for the production of a particular type or grade of olefin polymer, then the catalyst weight ratio and/or the reactant molar ratio can be adjusted (increased or decreased as needed) to make the measured die swell equivalent to that of the target die swell.

In certain embodiments, for instance, where the polymerization reactor system contains a slurry reactor (one or more than one), the reactor % solids can be in a range from about 25 to about 70 wt. %, or from about 30 to about 65 wt. %. For example, the reactor % solids can be in a range from about 30 to about 60 wt. %; alternatively, from about 30 to about 55 wt. %; alternatively, from about 35 to about 65 wt. %; alternatively, from about 35 to about 60 wt. %; alternatively, from about 35 to about 55 wt. %; alternatively, from about 40 to about 60 wt. %; alternatively, from about 40 to about 55 wt. %; or alternatively, from about 40 to about 50 wt. %.

Consistent with embodiments disclosed herein, the polymerization conditions that can be adjusted and/or controlled in the processes and methods described herein can be the catalyst weight ratio and/or the reactant molar ratio. However, as would be recognized by those of skill in the art, other polymerization conditions or process variables can be adjusted and/or controlled during the operation of a polymerization reactor system, and such conditions or variables can include, but are not limited to, reaction temperature, residence time, reactor pressure, catalyst system and activator flow rate into the reactor, olefin polymer output rate, recycle rate, hydrogen flow rate and concentration, reactor cooling status, slurry density, circulation pump power, and the like. These and other polymerization conditions or process variables also may affect the resultant die swell of the polymer, as well as other polymer attributes disclosed herein, but these were maintained substantially constant herein to focus on the impacts of the catalyst weight ratio and the reactant molar ratio.

For instance, and not intended to be bound by the following theory, it is believed that the weight ratio of the high or higher molecular weight component to the low or lower molecular weight component can increase (and the die swell may decrease) as the polymerization reaction temperature is increased and/or as the catalyst system residence time (or reaction time) is increased. The polymerization reaction temperature can be any suitable temperature depending upon the type of polymerization reactor(s) employed in the reactor system, the desired olefin polymer, and the like, amongst other variables. Generally, however, the reaction temperature can be in a range from about 25° C. to about 280° C., for example, from about 50° C. to about 280° C., from about 60° C. to about 200° C., from about 60° C. to about 150° C., from about 60° C. to about 125° C., from about 70° C. to about 110° C., or from about 80° C. to about 120° C., and the like. The residence time (or reaction time) can be any suitable residence time depending upon the type of polymerization reactor(s) employed in the reactor system, the number of polymerization reactors, the desired olefin polymer, the polymer production rate, and the like, amongst other variables. Generally, however, the residence time can be in a range from about 5 min to about 5 hr, for example, from about 10 min to about 4 hr, from about 15 min to about 3 hr, from about 10 min to about 2 hr, from about 15 min to about 90 min, or from about 20 min to about 1 hr, and the like.

In one embodiment, no hydrogen is added to the polymerization reactor system. As one of ordinary skill in the art would recognize, hydrogen can be generated in-situ by the first and/or second metallocene catalyst component during the dual catalyst olefin polymerization process. In this embodiment, there is no "added hydrogen" to the reactor system.

Although not required, however, hydrogen can be added to the polymerization reactor system in certain embodiments. Optionally, for instance, the methods and processes provided herein can further comprise a step of adding hydrogen to the polymerization reactor system to adjust a molecular weight parameter (e.g., weight-average molecular weight (Mw), number-average molecular weight (Mn), Mw/Mn, etc.) of the olefin polymer, and/or to adjust the melt index (MI) of the olefin polymer, if desired. Generally, the step of adding hydrogen can decrease the Mw (and/or Mn), and/or increase the MI of the polymer.

In embodiments where hydrogen is added to the polymerization reactor system, the hydrogen addition can be held substantially constant (e.g., within +/−20%), for example, for the production of a particular polymer grade. For example, the ratio of hydrogen to the olefin monomer in the polymerization process can be controlled, often by the feed ratio of hydrogen to the olefin monomer entering the reactor. However, in other embodiments, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

Catalyst Systems

In some embodiments, the dual catalyst system (two or more transition metal-based catalytic components) can comprise a first metallocene catalyst component and a second metallocene catalyst component, while in other embodiments, the dual catalyst system can comprise a first metallocene catalyst component, a second metallocene catalyst component, an activator, and a co-catalyst. The first metallocene catalyst component and the second metallocene catalyst component independently can comprise, for example, a transition metal (one or more than one) from Groups IIIB-VIIIB of the Periodic Table of the Elements. In one embodiment, the first metallocene catalyst component and the second metallocene catalyst component independently can comprise a Group III, IV, V, or VI transition metal, or a combination of two or more transition metals. The first metallocene catalyst component and the second metallocene catalyst component independently can comprise chromium, titanium, zirconium, hafnium, vanadium, or a combination thereof, or can comprise titanium, zirconium, hafnium, or a combination thereof, in other embodiments. Accordingly, the first metallocene catalyst component and the second metallocene catalyst component independently can comprise titanium, or zirconium, or hafnium, either singly or in combination.

In an embodiment, the first metallocene catalyst component can produce the low or lower molecular weight component of the olefin polymer, and the second metallocene catalyst component can produce the high or higher molecular weight component of the olefin polymer. These component terms are relative, are used in reference to each other, and are not limited to the actual molecular weights of the respective components. While not being limited thereto, the first metallocene catalyst component can comprise an unbridged metallocene; alternatively, an unbridged zirconium or hafnium based metallocene compound, or an unbridged zirconium, hafnium, or zirconium/hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with embodiments of the present invention are described in U.S. Pat. Nos. 7,199,073, 7,226,886, 7,312,283, and 7,619,047, the disclosures of which are incorporated herein by reference in their entirety.

In another embodiment, the first metallocene catalyst component can produce the low or lower molecular weight component of the olefin polymer, and the first metallocene catalyst component can comprise zirconium, or alternatively, hafnium. Representative and non-limiting examples of metallocene compounds that can be employed as the first metallocene compound can include, but are not limited to, the following (Ph=phenyl):

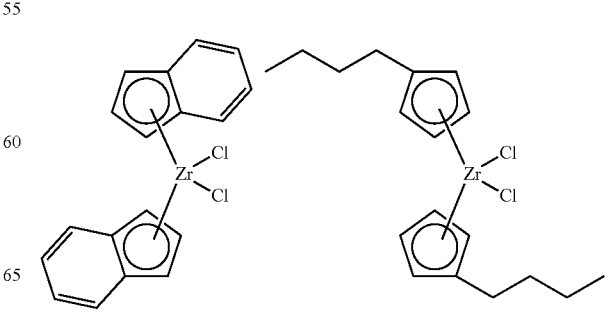

-continued

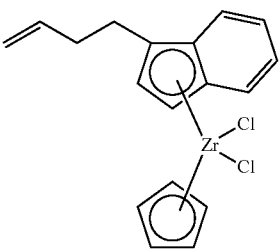

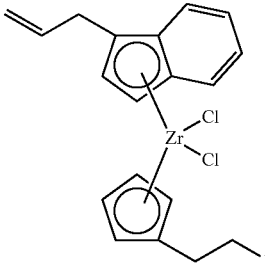

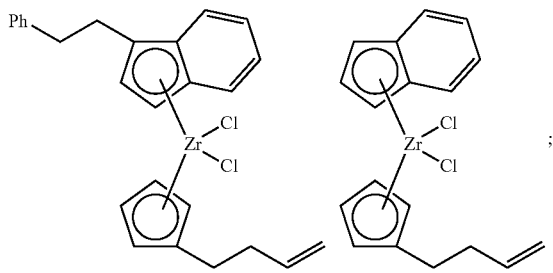

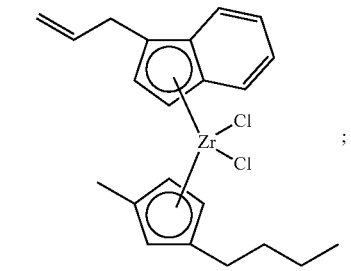

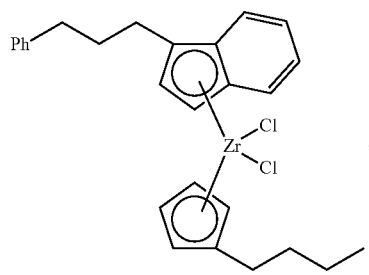

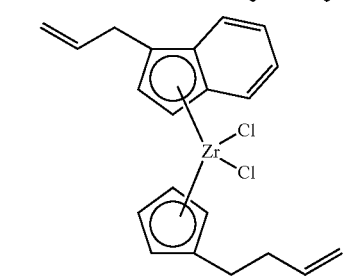

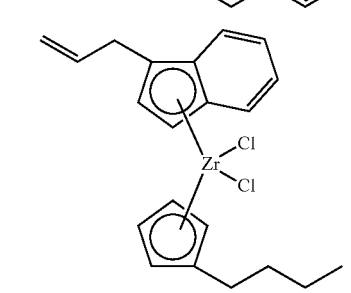

and the like, as well as combinations thereof.

Moreover, the first metallocene catalyst component can comprise an unbridged dinuclear metallocene such as those described in U.S. Pat. Nos. 7,919,639 and 8,080,681, the disclosures of which are incorporated herein by reference in their entirety. The first metallocene catalyst component can comprise an unbridged zirconium, hafnium, or zirconium/hafnium based dinuclear metallocene compound. For example, the first metallocene catalyst component can comprise an unbridged zirconium based homodinuclear metallocene compound, or an unbridged hafnium based homodinuclear metallocene compound, or an unbridged zirconium, hafnium, or zirconium/hafnium based heterodinuclear metallocene compound (i.e., a dinuclear compound with two hafniums, or two zirconiums, or one zirconium and one hafnium). Representative and non-limiting dinuclear compounds can include the following:

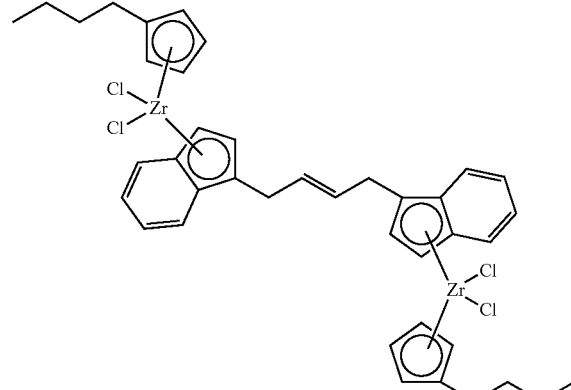

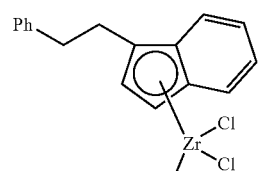

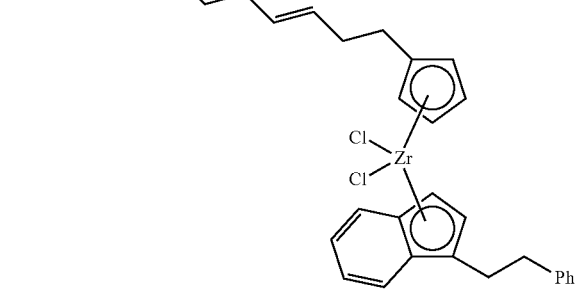

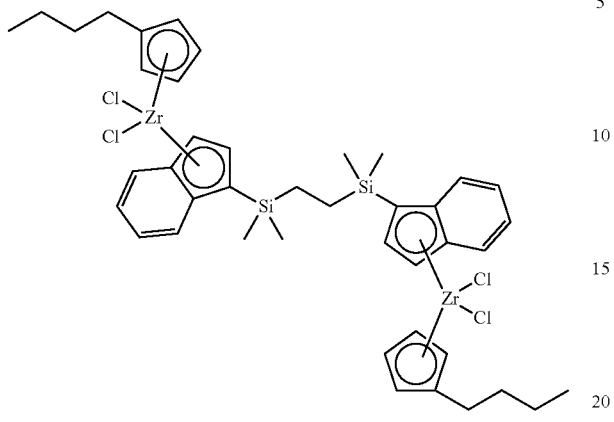
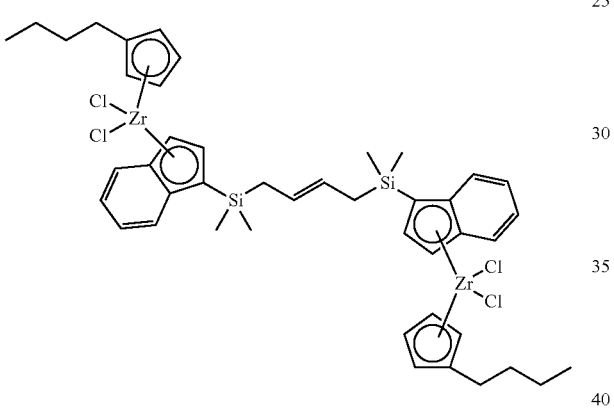
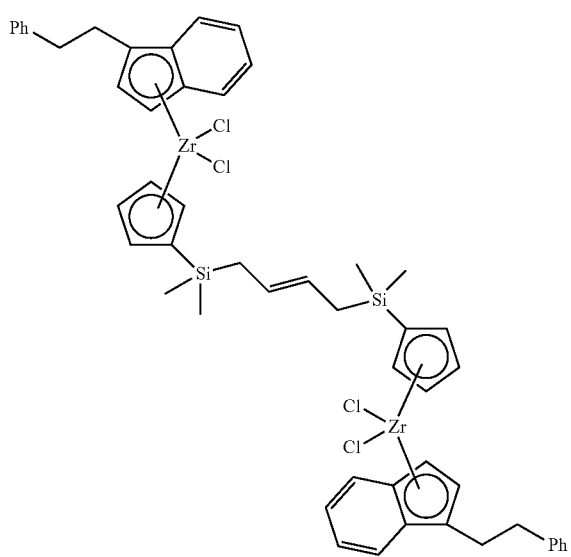
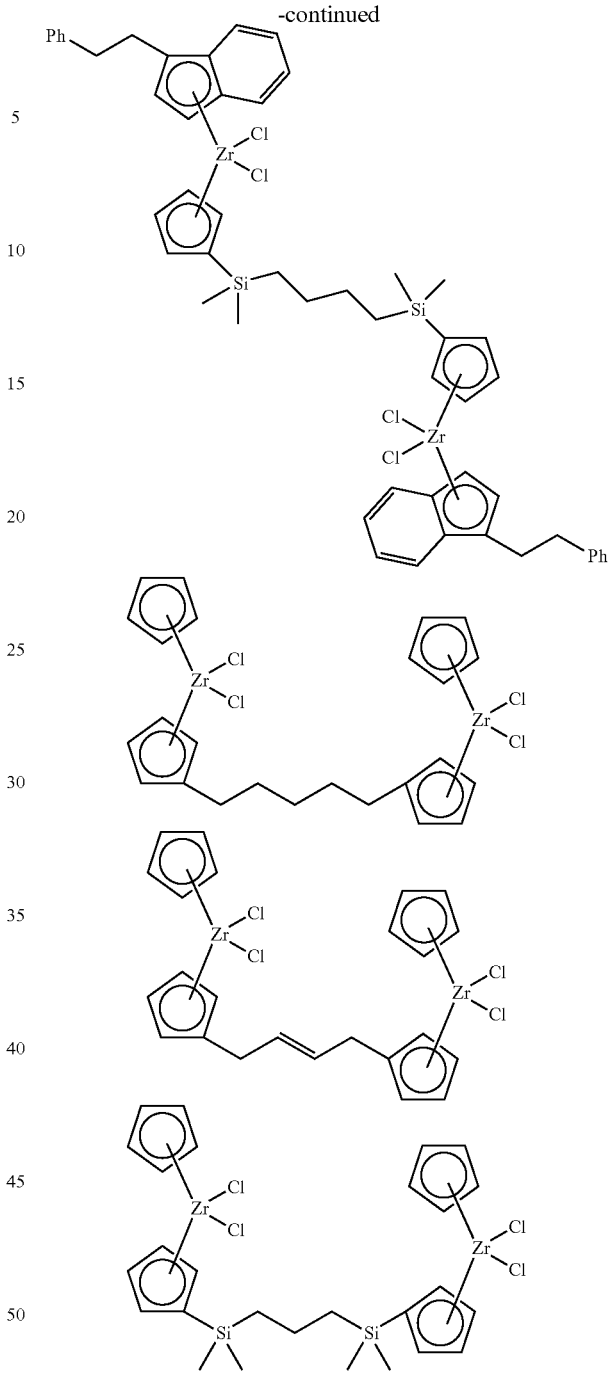

and the like, as well as combinations thereof.

While not being limited thereto, the second metallocene catalyst component can comprise a bridged metallocene compound, e.g., with titanium, zirconium, or hafnium, such as a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some embodiments, can contain an alkenyl substituent (e.g., a terminal alkenyl) on the bridging group, on a cyclopentadienyl-type group (e.g., a cyclopentadienyl group, a fluorenyl group, etc.), or on the bridging group and the cyclopentadienyl group. In another embodiment, the second metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other embodiments, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with embodiments of the present invention are described in U.S. Pat. Nos. 7,026,494, 7,041,617, 7,226,886, 7,312,283, 7,517,939, and 7,619,047, the disclosures of which are incorporated herein by reference in their entirety.

In another embodiment, the second metallocene catalyst component can produce the high or higher molecular weight component of the olefin polymer, and the second metallocene catalyst component can comprise zirconium, hafnium, or both. Representative and non-limiting examples of metallocene compounds that can be employed as the second metallocene compound can include, but are not limited to, the following (Ph=phenyl, Me=methyl, and t-Bu=tert-butyl):

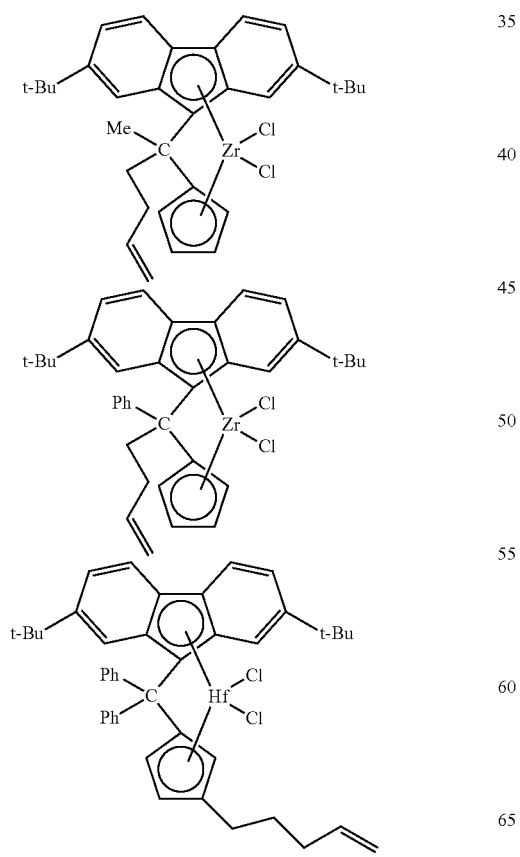

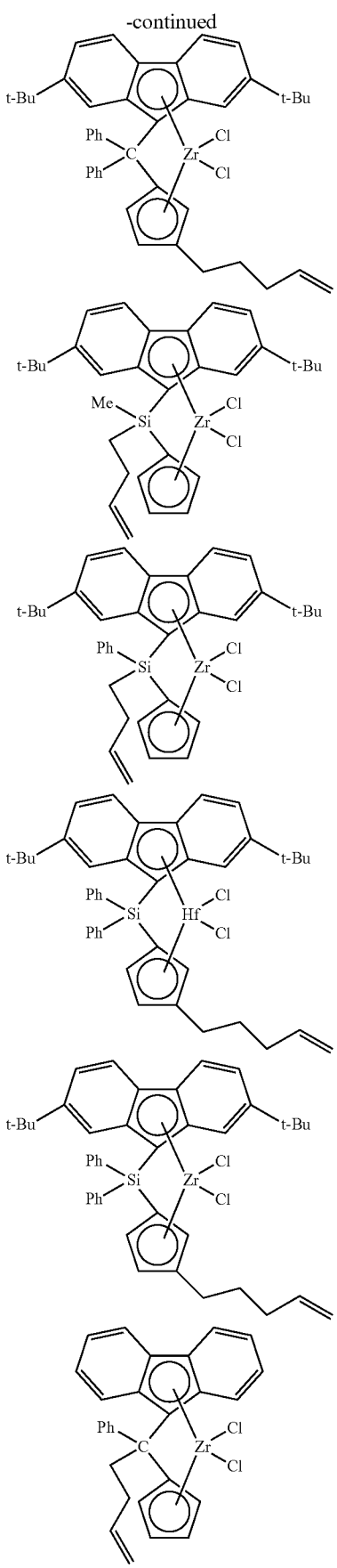

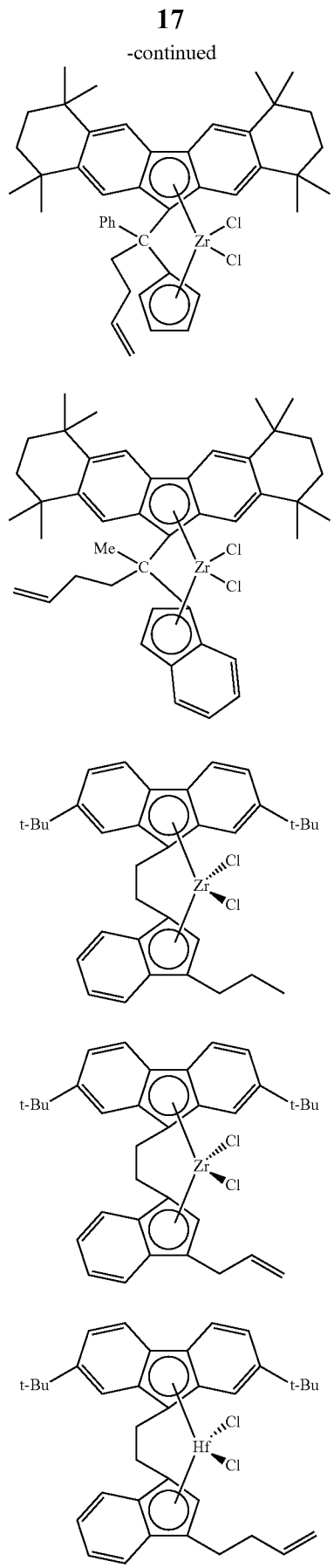

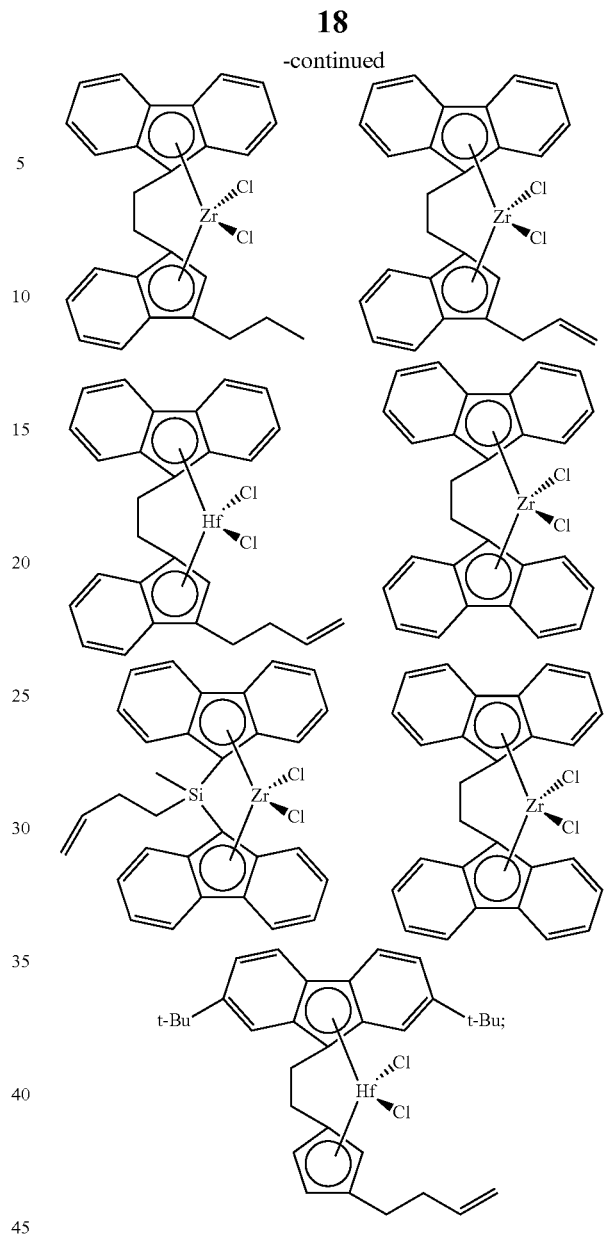

and the like, as well as combinations thereof.

In some embodiments, the dual catalyst system can comprise an activator. For example, the dual catalyst system can comprise an activator-support, an aluminoxane compound, an organoboron or organoborate compound, an ionizing ionic compound, and the like, or any combination thereof. The catalyst system can contain one or more than one activator.

In one embodiment, the dual catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another embodiment, the dual catalyst system can comprise an aluminoxane compound. In yet another embodiment, the dual catalyst system can comprise an organoboron or organoborate compound. In still another embodiment, the dual catalyst system can comprise an ionizing ionic compound.

In other embodiments, the dual catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,703,886, 8,916,494, and 9,023,959, which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one embodiment, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise silica; alternatively, alumina; alternatively, silica-alumina; or alternatively, silica-coated alumina.

The silica-alumina which can be used typically can have an alumina content from about 5 to about 95% by weight. In one embodiment, the alumina content of the silica-alumina can be from about 5 to about 50%, or from about 8% to about 30%, alumina by weight. In another embodiment, high alumina content silica-alumina materials can be employed, in which the alumina content of these silica-alumina materials typically can range from about 60% to about 90%, or from about 65% to about 80%, alumina by weight. According to yet another embodiment, the solid oxide component can comprise alumina without silica, and according to another embodiment, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

In an embodiment, the dual catalyst system can comprise an activator-support, and the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, and the like, as well as any mixture or combination thereof. In another embodiment, the dual catalyst system can comprise an activator-support, and the activator-support can comprise a fluorided solid oxide, a sulfated solid oxide, or a combination thereof. In yet another embodiment, the dual catalyst system can comprise an activator-support, and the activator-support can comprise fluorided alumina, sulfated alumina, fluorided silica-alumina, sulfated silica-alumina, fluorided silica-zirconia, fluorided-chlorided silica-coated alumina, fluorided silica-coated alumina, sulfated silica-coated alumina, and the like, as well as any mixture or combination thereof.

Commonly used polymerization co-catalysts which can be utilized in the dual catalyst system can include, but are not limited to, metal alkyl, or organometal, co-catalysts, with the metal being, for example, aluminum. The dual catalyst systems provided herein can comprise a co-catalyst, or a combination of co-catalysts. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Thus, a dual catalyst system provided herein can comprise a first metallocene catalyst component, a second metallocene catalyst component, an activator, and a co-catalyst. In an embodiment, the co-catalyst can comprise an organoaluminum compound, such as triethylaluminum or triisobutylaluminum, while the activator can comprise a fluorided solid oxide or a sulfated solid oxide, representative examples of which can include fluorided alumina, sulfated alumina, fluorided silica-alumina, sulfated silica-alumina, fluorided silica-zirconia, fluorided-chlorided silica-coated alumina, fluorided silica-coated alumina, sulfated silica-coated alumina, as well as any combination thereof.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, homopolymerization, terpolymerization, and similar polymerization reactions using an olefin monomer with at least one different olefinic compound. As disclosed, polymerization processes are meant to encompass oligomerization processes as well.

As an example, any resultant ethylene copolymers or terpolymers generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{24}$ olefin; alternatively, a $C_2$-$C_{12}$ olefin; alternatively, a $C_6$-$C_{24}$ olefin; alternatively, a $C_2$-$C_{10}$ α-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one embodiment, the olefin monomer in the polymerization process can comprise ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment, the olefin monomer can comprise ethylene and the olefin comonomer can comprise an α-olefin, while in yet another embodiment, the comonomer can comprise propylene, 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Generally, the amount of comonomer introduced into a polymerization reactor to produce the copolymer can be from about 0.01 weight percent (wt. %) to about 50 weight percent of the comonomer based on the total weight of the monomer and comonomer. According to another embodiment, the amount of comonomer introduced into a polymerization reactor can be from about 0.01 weight percent to about 40 weight percent comonomer based on the total weight of the monomer and comonomer. In still another embodiment, the amount of comonomer introduced into a polymerization reactor can be from about 0.1 weight percent to about 35 weight percent comonomer based on the total weight of the monomer and comonomer. Yet, in another embodiment, the amount of comonomer introduced into a polymerization reactor can be from about 0.5 weight percent to about 20 weight percent comonomer based on the total weight of the monomer and comonomer.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, or ethylene/1-octene), a propylene random copolymer, a propylene block copolymer, and the like, including combinations thereof. Moreover, the olefin polymer (or oligomer) can comprise, in certain embodiments, an olefin dimer, olefin trimer, or olefin tetramer, and including mixtures or combinations thereof. Thus, olefin polymer encompasses oligomerization products of $C_6$-$C_{24}$ olefins (or $C_6$-$C_{24}$ α-olefins, or 1-hexene, or 1-octene, or 1-decene, or 1-dodecene, or 1-tetradecene, or 1-hexadecene).

In some embodiments, the olefin polymer can be characterized as having a multimodal molecular weight distribution, while in other embodiments, the olefin polymer can be characterized as having a bimodal molecular weight distribution. The olefin polymer can have any molecular weight characteristics (e.g., Mn, Mw, or Mw/Mn), melt flow characteristics (e.g., melt index, high load melt index, or zero-shear viscosity), density characteristics (e.g., an ethylene copolymer with a density in a range from about 0.91 to about 0.965, from about 0.92 to about 0.965, or from about 0.95 to about 0.965 g/cm$^3$), long chain branching characteristics, and so forth, that are suitable for the intended end-use application, for example, such as blow molded bottles and containers.

Polymerization Reactor Systems

The disclosed methods are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.), and as discussed herein.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min, pellet) was determined in accordance with ASTM D1238 at 190° C. with a 2,160 gram weight, and high load melt index (HLMI, g/10 min, pellet) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of each component of the molecular weight distribution curve).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta*(\omega)| = \frac{\eta 0}{[1 + (\tau_\eta \omega)^a]^{(1-n)/a}},$$

wherein: |η*(ω)|=magnitude of complex shear viscosity;

$\tau_0$=zero shear viscosity;

$\tau_\eta$=viscous relaxation time (Tau(η));

a="breadth" parameter (CY-a parameter);

n=fixes the final power law slope, fixed at 2/11; and

ω=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume 1, Fluid Mechanics,* 2nd Edition, John Wiley & Sons (1987); each of which is incorporated herein by reference in its entirety.

A creep adjustment was used to extend the low frequency range of rheological characterization to 10$^{-4}$ sec$^{-1}$. In the creep test, a constant shear stress $\sigma_0$ was applied to the specimen and the shear strain γ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement.

The generalized Voigt model was used for modeling the time-dependent creep compliance $J(t)=\gamma(t)/\sigma_0$ in terms of a discrete spectrum $J_k$ of retardation times $\tau_k$ and zero shear rate viscosity $\eta_0$, $$J(t) = \sum_{k=1}^{N} J_k (1 - e^{-t/\tau_k}) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1+\omega^2 \tau_k^2}, \quad J''(\omega) = \frac{1}{\omega \eta_0} + \sum_{k=1}^{N} J_k \frac{\omega \tau_k}{1+\omega^2 \tau_k^2}.$$

From the relationship between the complex modulus and the complex compliance, the storage and loss modulus of dynamic frequency sweep data can be obtained as $$G'(\omega) = \frac{J'(\omega)}{[J'(\omega)]^2 + [J''(\omega)]^2}, \quad G'(\omega) = \frac{J''(\omega)}{[J'(\omega)]^2 + [J''(\omega)]^2}.$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of $\omega > t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-500, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1~10%) oscillatory shear in the linear viscoelastic regime was applied at angular frequencies from 0.0316 to 316 sec$^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*_7|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus |G*| at a frequency of 0.01 rad/sec multiplied by 0.04.

Sulfated alumina activator-supports used in Examples 1-6 were prepared as follows. Bohemite was obtained from W.R. Grace & Company under the designation "Alumina A." This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Fluorided silica-coated aluminas used in Examples 7-12 were prepared as follows. Alumina A, from W.R. Grace Company, was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina was collected and stored under dry nitrogen, and was used without exposure to the atmosphere.

Pilot plant polymerizations were conducted in a 30-gallon slurry loop reactor at a production rate of approximately 30 pounds of polymer per hour. Polymerization runs were carried out under continuous particle form process conditions in a loop reactor (also referred to as a slurry process) by contacting separate metallocene solutions, an organoaluminum solution (triisobutylaluminum, TIBA), and an activator-support (sulfated alumina or fluorided silica-coated alumina) in a 1-L stirred autoclave (30 min residence time) with output to the loop reactor. The weight ratio of activator-support to total metallocene (first metallocene and second metallocene compounds) was approximately 1.6:1.

Ethylene used was polymerization grade ethylene which was purified through a column of AZ 300 (activated at 300-500° F. in nitrogen). 1-Hexene was polymerization grade 1-hexene (obtained from Chevron Phillips Chemical Company) which was purified by nitrogen purging and storage over AZ 300 activated at 300-500° F. in nitrogen. Liquid isobutane was used as the diluent.

Certain polymerization conditions for Examples 1-12 are provided in Table I below (mole % ethylene and ppm by weight of triisobutylaluminum (TIBA) are based on isobutane diluent). The polymerization conditions also included a reactor pressure of 590 psig, a polymerization temperature of 90° C., a feed rate of 33-43 lb/hr ethylene, and 2.8-4.0 ppm total of MET 1 and MET 2 (based on the weight of isobutane diluent). The structures for MET 1 and MET 2, used in Examples 1-12, are shown below:

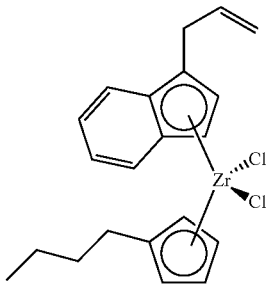

MET 1

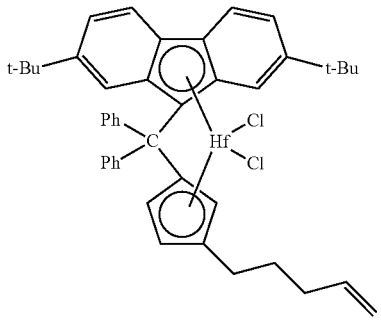

MET 2

For Examples 1-12, blow molded 1-gallon containers were produced from the polymer resins on a Uniloy reciprocating blow molding machine with an extruder screw diameter of 2.5" and a L/D Ratio of 20:1. The parison was extruded using a 2.5" diverging die and then blown into a mold to produce 1-gallon industrial bottles weighing approximately 105 g. The die gap was in the 0.016-0.024 inch range, and was varied along with temperature, pressure, and cycle time (output rate) to produce 1-gallon blow molded bottles of acceptable quality.

Die swell (%) is the relative size of the parison versus the die size, and was determined as follows. The width of the flashing at the bottom of the bottle (layflat bottom, LF) was measured, and converted to % die swell (diameter) using the following conversions:

Maximum parison circumference (PC)=2×LF

Maximum parison diameter (PD)=PC/π

PD=2×LF/π

Die swell (%)=(PD/DD−1)×100%, where DD is die diameter (2.5")

Die swell (%)=(((2×LF/π)/2.5)−1)×100%

Examples 1-12

As shown in Table I, Examples 1-6 and Examples 7-12 were produced under similar polymerization conditions, other than the weight ratio of MET 1:MET 2 and the molar ratio of 1-hexene:ethylene. The average weight ratio of MET 1:MET 2 was 1.24 for Examples 1-6 and 0.81 for Examples 7-12, and the average molar ratio of 1-hexene:ethylene was 0.08 for Examples 1-6 and 0.05 for Examples 7-12. Unexpectedly, the die swell for Examples 1-6 (average of 36%) was significantly less than the die swell for Examples 7-12 (average of 52%) as a result of the increased weight ratio of MET 1:MET 2 and the increased molar ratio of 1-hexene:ethylene. This is particularly unexpected, since an increase in the catalyst weight ratio increased the relative amount of the MET 1, which generally produces the low or lower molecular weight component of the copolymer.

Interestingly, despite the significant increase in the molar ratio of 1-hexene:ethylene (from 0.05 to 0.08, an increase of 60%) for Examples 1-6 as compared to Examples 7-12, the density decreased only 0.003-0.004 g/cc, i.e., it was substantially constant or unchanged (less than or within 0.002-0.005 g/cc).

The average Mw and Mw/Mn for Examples 7-12 were 220 kg/mol and 9.8, respectively, and the average Mw and Mw/Mn for Examples 1-6 were 290 kg/mol and 15.7, respectively. Thus, the increased weight ratio of MET 1:MET 2 and the increased molar ratio of 1-hexene:ethylene surprisingly increased molecular weight (Mw increased by 30%) and broadened the molecular weight distribution (Mw/Mn increased by 60%).

The relative amount of the high or higher molecular weight (HMW) component also increased significantly from Examples 7-12 (average of 12.7% HMW based on the whole polymer) to Examples 1-6 (average of 19.7% HMW based on the whole polymer). The respective low molecular weight and high molecular weight component properties were determined by deconvoluting the molecular weight distribution of each polymer. The relative amounts of the components (weight percentages) in the polymer were determined using a commercial software program (Systat Software, Inc., Peak Fit™ v. 4.05). See also U.S. Pat. No. 7,300,983, which is incorporated herein by reference in its entirety.

The average ratio of HLMI/MI for Examples 7-12 was 100, and the average ratio of HLMI/MI for Examples 1-6 was 310. Thus, the increased weight ratio of MET 1:MET 2 and the increased molar ratio of 1-hexene:ethylene unexpectedly increased the melt flow ratio by over 200%.

The rheological slope parameter, i.e., the slope of a plot of the viscosity (Pa-sec) versus shear rate (sec$^{-1}$) at 100 sec$^{-1}$ for the polymer at 190° C., decreased significantly from Examples 7-12 (0.45-0.57 range) to Examples 1-6 (0.20-0.25 range), a reduction of about 50% due to the increase in the weight ratio of MET 1:MET 2 and the molar ratio of 1-hexene:ethylene. This rheological parameter was determined at 190° C. using creep adjustment as described herein.

TABLE I

Examples 1-12.

| Example | 1-hexene (lb/hr) | $H_2$ (lb/hr) | MET 1/MET 2 (weight ratio) | 1-hexene/$C_2H_4$ (mole ratio) | $C_2H_4$ (mole %) | TIBA (ppm) | Density (g/cc) | Die Swell (%) |
|---|---|---|---|---|---|---|---|---|
| 1 | 0.28 | 0.0041 | 1.03 | 0.08 | 11.77 | 143 | 0.956 | 31 |
| 2 | 0.24 | 0.0039 | 1.31 | 0.09 | 11.78 | 129 | 0.957 | 36 |
| 3 | 0.26 | 0.0037 | 1.34 | 0.08 | 11.99 | 109 | 0.956 | 36 |
| 4 | 0.30 | 0.0037 | 1.20 | 0.08 | 11.90 | 117 | 0.957 | 38 |
| 5 | 0.23 | 0.0037 | 1.27 | 0.08 | 11.71 | 110 | 0.957 | 37 |
| 6 | 0.28 | 0.0037 | 1.27 | 0.08 | 11.93 | 118 | 0.957 | 36 |
| 7 | 0.24 | 0.0035 | 0.85 | 0.04 | 12.33 | 85 | 0.960 | 56 |
| 8 | 0.20 | 0.0038 | 0.81 | 0.05 | 11.33 | 107 | 0.961 | 51 |
| 9 | 0.21 | 0.0037 | 0.83 | 0.05 | 11.76 | 85 | 0.961 | 54 |
| 10 | 0.20 | 0.0037 | 0.78 | 0.05 | 12.43 | 113 | 0.960 | 51 |
| 11 | 0.21 | 0.0037 | 0.79 | 0.05 | 12.04 | 113 | 0.960 | 54 |
| 12 | 0.13 | 0.0037 | 0.77 | 0.05 | 12.25 | 130 | 0.960 | 49 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A polymerization process, the process comprising:

(1) contacting a dual catalyst system with an olefin monomer and an olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise:

a catalyst weight ratio of the first:second catalyst component, and a reactant molar ratio of the comonomer:monomer; and (2) controlling a die swell of the olefin polymer by adjusting the catalyst weight ratio and/or the reactant molar ratio.

Embodiment 2

A method of controlling a die swell of an olefin polymer, the method comprising:

(i) contacting a dual catalyst system with an olefin monomer and an olefin comonomer in a polymerization reactor system under polymerization conditions to produce the olefin polymer, wherein the dual catalyst system comprises a first metallocene catalyst component and a second metallocene catalyst component, and wherein the polymerization conditions comprise:

a catalyst weight ratio of the first:second catalyst component, and a reactant molar ratio of the comonomer:monomer; and (ii) adjusting the catalyst weight ratio and/or the reactant molar ratio to control the die swell of the olefin polymer.

Embodiment 3

A process for producing an olefin polymer with a target die swell, the process comprising:

(a) contacting a dual catalyst system with an olefin monomer and an olefin comonomer in a polymerization reactor system under polymerization conditions, wherein the dual catalyst system comprises a first metallocene catalyst component and a second metallocene catalyst component, and wherein the polymerization conditions comprise:

a catalyst weight ratio of the first:second catalyst component, and a reactant molar ratio of the comonomer:monomer; and (b) controlling the catalyst weight ratio and/or the reactant molar ratio to produce the olefin polymer with the target die swell.

Embodiment 4

The method or process defined in any one of embodiments 1-3, wherein the dual catalyst system comprises any activator disclosed herein.

Embodiment 5

The method or process defined in any one of embodiments 1-4, wherein the dual catalyst system comprises an activator-support, an aluminoxane compound, an organoboron or organoborate compound, an ionizing ionic compound, or any combination thereof.

Embodiment 6

The method or process defined in any one of embodiments 1-5, wherein the dual catalyst system comprises an aluminoxane compound, an organoboron or organoborate compound, an ionizing ionic compound, or any combination thereof.

Embodiment 7

The method or process defined in any one of embodiments 1-6, wherein the dual catalyst system comprises an aluminoxane compound.

Embodiment 8

The method or process defined in any one of embodiments 1-6, wherein the dual catalyst system comprises an organoboron or organoborate compound.

Embodiment 9

The method or process defined in any one of embodiments 1-6, wherein the dual catalyst system comprises an ionizing ionic compound.

Embodiment 10

The method or process defined in any one of embodiments 1-5, wherein the dual catalyst system comprises an activator-support comprising a solid oxide treated with an electron-withdrawing anion, for example, comprising any solid oxide and any electron-withdrawing anion disclosed herein.

Embodiment 11

The method or process defined in any one of embodiments 1-5, wherein the dual catalyst system comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Embodiment 12

The method or process defined in any one of embodiments 1-5, wherein the dual catalyst system comprises an activator-support comprising fluorided alumina, sulfated alumina, fluorided silica-alumina, sulfated silica-alumina, fluorided silica-zirconia, fluorided silica-coated alumina, fluorided-chlorided silica-coated alumina, sulfated silica-coated alumina, or any combination thereof.

Embodiment 13

The method or process defined in any one of the preceding embodiments, wherein the dual catalyst system comprises any co-catalyst disclosed herein, for example, a metal alkyl, an organoaluminum, etc.

Embodiment 14

The method or process defined in any one of the preceding embodiments, wherein the dual catalyst system comprises an organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 15

The method or process defined in any one of the preceding embodiments, wherein the die swell decreases as the catalyst weight ratio increases.

Embodiment 16

The method or process defined in any one of the preceding embodiments, wherein the catalyst weight ratio is in any range of catalyst weight ratios disclosed herein.

Embodiment 17

The method or process defined in any one of the preceding embodiments, wherein the catalyst weight ratio is in a range from about 1:5 to about 5:1, from about 1:2 to about 2:1, or from about 1:1.5 to about 1.5:1.

Embodiment 18

The method or process defined in any one of the preceding embodiments, wherein the die swell decreases as the reactant molar ratio increases.

Embodiment 19

The method or process defined in any one of the preceding embodiments, wherein the reactant molar ratio is in any range of reactant molar ratios disclosed herein.

Embodiment 20

The method or process defined in any one of the preceding embodiments, wherein the reactant molar ratio is in a range from about 0.02:1 to about 0.2:1, from about 0.02:1 to about 0.15:1, or from about 0.03:1 to about 0.1:1.

Embodiment 21

The method or process defined in any one of the preceding embodiments, wherein the die swell is in any range of die swells disclosed herein.

Embodiment 22

The method or process defined in any one of the preceding embodiments, wherein the die swell is in a range from about 10 to about 70%, from about 20 to about 65%, or from about 25 to about 60%.

Embodiment 23

The method or process defined in any one of the preceding embodiments, wherein the reactor % solids is in any range of % solids disclosed herein.

Embodiment 24

The method or process defined in any one of the preceding embodiments, wherein the reactor % solids is in a range from about 30 to about 65 wt. %.

Embodiment 25

The method or process defined in any one of the preceding embodiments, wherein the reactor % solids is in a range from about 30 to about 55 wt. %.

Embodiment 26

The method or process defined in any one of the preceding embodiments, wherein the polymerization reactor system comprises a batch reactor, a slurry reactor, a gas-phase reactor, a solution reactor, a high pressure reactor, a tubular reactor, an autoclave reactor, or a combination thereof.

Embodiment 27

The method or process defined in any one of the preceding embodiments, wherein the polymerization reactor system comprises a slurry reactor, a gas-phase reactor, a solution reactor, or a combination thereof.

Embodiment 28

The method or process defined in any one of the preceding embodiments, wherein the polymerization reactor system comprises a slurry reactor.

Embodiment 29

The method or process defined in any one of embodiments 1-28, wherein the polymerization reactor system comprises a single reactor.

Embodiment 30

The method or process defined in any one of embodiments 1-28, wherein the polymerization reactor system comprises 2 reactors.

Embodiment 31

The method or process defined in any one of embodiments 1-28, wherein the polymerization reactor system comprises more than 2 reactors.

Embodiment 32

The method or process defined in any one of embodiments 1-31, wherein the olefin polymer has a multimodal molecular weight distribution.

Embodiment 33

The method or process defined in any one of embodiments 1-31, wherein the olefin polymer has a bimodal molecular weight distribution.

Embodiment 34

The method or process defined in any one of the preceding embodiments, wherein the olefin monomer comprises a $C_2$-$C_{20}$ olefin.

Embodiment 35

The method or process defined in any one of the preceding embodiments, wherein the olefin monomer and the olefin comonomer independently comprise a $C_2$-$C_{20}$ alpha-olefin.

Embodiment 36

The method or process defined in any one of the preceding embodiments, wherein the olefin monomer comprises ethylene.

Embodiment 37

The method or process defined in any one of the preceding embodiments, wherein the olefin monomer comprises ethylene and the olefin comonomer comprises a $C_3$-$C_{10}$ alpha-olefin.

Embodiment 38

The method or process defined in any one of the preceding embodiments, wherein the olefin monomer comprises ethylene and the olefin comonomer comprises 1-butene, 1-hexene, 1-octene, or a mixture thereof.

Embodiment 39

The method or process defined in any one of the preceding embodiments, wherein the olefin polymer comprises any olefin polymer disclosed herein.

Embodiment 40

The method or process defined in any one of the preceding embodiments, wherein the olefin polymer comprises an ethylene/1-butene copolymer, an ethylene/1-hexene copolymer, an ethylene/1-octene copolymer, or a combination thereof.

Embodiment 41

The method or process defined in any one of the preceding embodiments, wherein the olefin polymer comprises an ethylene copolymer, and the density of the ethylene copolymer is in a range from about 0.91 to about 0.965, from about 0.92 to about 0.965, or from about 0.95 to about 0.965 g/cm$^3$.

Embodiment 42

The method or process defined in any one of the preceding embodiments, wherein the first metallocene catalyst component and the second metallocene catalyst component independently comprise chromium, vanadium, titanium, zirconium, hafnium, or a combination thereof.

Embodiment 43

The method or process defined in any one of the preceding embodiments, wherein the first metallocene catalyst component and the second metallocene catalyst component independently comprise titanium, zirconium, hafnium, or a combination thereof.

Embodiment 44

The method or process defined in any one of the preceding embodiments, wherein the reaction temperature is in any range of polymerization reaction temperatures disclosed herein.

Embodiment 45

The method or process defined in any one of the preceding embodiments, wherein the residence time is in any range of residence times disclosed herein.

Embodiment 46

The method or process defined in any one of the preceding embodiments, wherein the first metallocene catalyst component produces the lower molecular weight component of the olefin polymer.

Embodiment 47

The method or process defined in any one of the preceding embodiments, wherein the first metallocene catalyst component comprises any first metallocene catalyst component disclosed herein.

Embodiment 48

The method or process defined in any one of the preceding embodiments, wherein the first metallocene catalyst component comprises zirconium.

Embodiment 49

The method or process defined in any one of the preceding embodiments, wherein the second metallocene catalyst component produces the higher molecular weight component of the olefin polymer.

Embodiment 50

The method or process defined in any one of the preceding embodiments, wherein the second metallocene catalyst component comprises any second metallocene catalyst component disclosed herein.

Embodiment 51

The method or process defined in any one of the preceding embodiments, wherein the second metallocene catalyst component comprises zirconium and/or hafnium.

Embodiment 52

The method or process defined in any one of embodiments 1-51, wherein no hydrogen is added to the polymerization reactor system.

Embodiment 53

The method or process defined in any one of embodiments 1-51, wherein hydrogen is added to the polymerization reactor system, and the hydrogen addition is substantially constant, for example, for a particular polymer grade.

Embodiment 54

The method or process defined in any one of embodiments 1-51, further comprising a step of adding hydrogen to the polymerization reactor system to adjust a molecular weight parameter (e.g., Mw, Mn, Mw/Mn, etc.) of the polymer.

Embodiment 55

The method or process defined in any one of embodiments 1-51, further comprising a step of adding hydrogen to the polymerization reactor system to adjust the weight-average molecular weight (Mw) and/or the melt index (MI) of the polymer.

Embodiment 56

The method or process defined in any one of embodiments 53-55, wherein the step of adding hydrogen decreases the Mw of the polymer.

Embodiment 57

The method or process defined in any one of embodiments 53-56, wherein the step of adding hydrogen increases the melt index of the polymer.

Embodiment 58

The method or process defined in any one of the preceding embodiments, further comprising the steps of determining (or measuring) the die swell, and adjusting the catalyst weight ratio and/or the reactant molar ratio based on the difference between the measured die swell and the target die swell.

We claim:

1. A polymerization process, the process comprising:
   (1) contacting a dual catalyst system with an olefin monomer and an olefin comonomer in a polymerization reactor system under polymerization conditions to produce an olefin polymer,
   wherein the olefin monomer comprises ethylene and the olefin comonomer comprises a $C_3$-$C_{10}$ alpha-olefin,
   wherein the olefin polymer comprises a higher molecular weight component and a lower molecular weight component,
   wherein the dual catalyst system comprises a first metallocene catalyst component that produces the lower molecular weight component and a second metallocene catalyst component that produces the higher molecular weight component, and
   wherein the polymerization conditions comprise:
      a catalyst weight ratio of the first:second catalyst component, and
      a reactant molar ratio of the comonomer:monomer; and
   (2) controlling a die swell of the olefin polymer by adjusting the catalyst weight ratio, by adjusting the reactant molar ratio, or by adjusting both the catalyst weight ratio and the reactant molar ratio,
   wherein the die swell decreases as the catalyst weight ratio increases, and
   wherein the die swell decreases as the reactant molar ratio increases.

2. The process of claim 1, wherein the polymerization reactor system comprises a slurry reactor, a gas-phase reactor, a solution reactor, or a combination thereof.

3. The process of claim 1, wherein the polymerization reactor system comprises a single reactor.

4. The process of claim 1, wherein the olefin comonomer comprises 1-hexene.

5. The process of claim 1, further comprising the steps of:
   determining the die swell; and
   adjusting the catalyst weight ratio and/or the reactant molar ratio based on the difference between the determined die swell and a target die swell.

6. The process of claim 1, wherein the first metallocene catalyst component and the second metallocene catalyst component independently comprise titanium, zirconium, hafnium, or a combination thereof.

7. The process of claim 6, wherein:
the first metallocene catalyst component comprises zirconium; and
the second metallocene catalyst component comprises zirconium and/or hafnium.

8. The process of claim 1, wherein:
the density of the olefin polymer is substantially unchanged as the catalyst weight ratio and/or the reactant molar ratio increases; and
the amount of the higher molecular weight component of the olefin polymer increases as the catalyst weight ratio and/or the reactant molar ratio increases.

9. A method of controlling a die swell of an olefin polymer, the method comprising:
(i) contacting a dual catalyst system with an olefin monomer and an olefin comonomer in a polymerization reactor system under polymerization conditions to produce the olefin polymer,
wherein the olefin monomer comprises ethylene and the olefin comonomer comprises a $C_3$-$C_{10}$ alpha-olefin,
wherein the dual catalyst system comprises a first metallocene catalyst component that produces a lower molecular weight component of the olefin polymer and a second metallocene catalyst component that produces a higher molecular weight component of the olefin polymer, and
wherein the polymerization conditions comprise:
a catalyst weight ratio of the first:second catalyst component, and
a reactant molar ratio of the comonomer:monomer; and
(ii) adjusting the catalyst weight ratio, adjusting the reactant molar ratio, or adjusting both the catalyst weight ratio and the reactant molar ratio, to control the die swell of the olefin polymer,
wherein the die swell decreases as the catalyst weight ratio increases, and
wherein the die swell decreases as the reactant molar ratio increases.

10. The method of claim 9, wherein the dual catalyst system further comprises an activator and a co-catalyst.

11. The method of claim 9, wherein the die swell is in a range from about 20 to about 65%.

12. The method of claim 9, wherein:
a Mw of the olefin polymer increases as the catalyst weight ratio and/or the reactant molar ratio increases;
a Mw/Mn of the olefin polymer increases as the catalyst weight ratio and/or the reactant molar ratio increases; and
a ratio of HLMI/MI of the olefin polymer increases as the catalyst weight ratio and/or the reactant molar ratio increases.

13. A process for producing an olefin polymer with a target die swell, the process comprising:
(a) contacting a dual catalyst system with an olefin monomer and an olefin comonomer in a polymerization reactor system under polymerization conditions,
wherein the olefin monomer comprises ethylene and the olefin comonomer comprises 1-butene, 1-hexene, 1-octene, or a mixture thereof,
wherein the dual catalyst system comprises a first metallocene catalyst component that produces a lower molecular weight component of the olefin polymer and a second metallocene catalyst component that produces a higher molecular weight component of the olefin polymer, and
wherein the polymerization conditions comprise:
a catalyst weight ratio of the first:second catalyst component, and
a reactant molar ratio of the comonomer:monomer; and
(b) controlling the catalyst weight ratio, controlling the reactant molar ratio, or controlling both the catalyst weight ratio and the reactant molar ratio, to produce the olefin polymer with the target die swell,
wherein die swell decreases as the catalyst weight ratio increases and the reactant molar ratio increases.

14. The process of claim 13, wherein:
the first metallocene catalyst component comprises zirconium; and
the second metallocene catalyst component comprises zirconium and/or hafnium.

15. The process of claim 13, wherein:
the catalyst weight ratio is in a range from about 1:2 to about 2:1;
the reactant molar ratio of the comonomer:monomer is in a range from about 0.02:1 to about 0.15:1; and
the target die swell is in a range from about 25 to about 60%.

16. The process of claim 13, wherein:
the polymerization reactor system comprises a loop slurry reactor; and
the olefin comonomer comprises 1-hexene.

17. The process of claim 13, wherein the dual catalyst system comprises:
a first metallocene catalyst component comprising an unbridged metallocene compound containing zirconium;
a second metallocene catalyst component comprising a bridged metallocene compound containing zirconium or hafnium and a fluorenyl group;
an activator comprising an activator-support, an aluminoxane compound, an organoboron or organoborate compound, an ionizing ionic compound, or any combination thereof; and
a co-catalyst comprising an organoaluminum compound.

* * * * *